(12) United States Patent
Alghamdi et al.

(10) Patent No.: US 11,965,819 B2
(45) Date of Patent: Apr. 23, 2024

(54) METHOD TO DETERMINE POST-WELD HEAT TREATMENT REQUIREMENTS FOR EXTERNAL WELDED ATTACHMENT TO AVOID ENVIRONMENTAL STRESS CORROSION CRACKING

(71) Applicant: Saudi Arabian Oil Company, Dhahran (SA)

(72) Inventors: Tariq A. Alghamdi, Dammam (SA); Rashid D. Al-Hajri, Abqaiq (SA)

(73) Assignee: SAUDI ARABIAM OIL COMPANY, Dhahran (SA)

( * ) Notice: Subject to any disclaimer, the term of this patent is extended or adjusted under 35 U.S.C. 154(b) by 458 days.

(21) Appl. No.: 17/444,308

(22) Filed: Aug. 3, 2021

(65) Prior Publication Data

US 2023/0041257 A1 Feb. 9, 2023

(51) Int. Cl.
  *G01N 19/08* (2006.01)
  *B23K 31/12* (2006.01)
  *B23K 101/04* (2006.01)

(52) U.S. Cl.
  CPC ........... *G01N 19/08* (2013.01); *B23K 31/125* (2013.01); *B23K 2101/04* (2018.08)

(58) Field of Classification Search
  CPC ... G01N 19/08; B23K 31/125; B23K 2101/04
  See application file for complete search history.

(56) References Cited

U.S. PATENT DOCUMENTS 6,676,777 B2 * 1/2004 Kimura .................. C21D 9/505
   148/529
7,618,503 B2 * 11/2009 McCrink ................ C21D 9/505
   148/663

FOREIGN PATENT DOCUMENTS

WO    2015061487 A2    4/2015

OTHER PUBLICATIONS

Rashed Alhajri et al, Optimization of Postweld Heat Treatment Requirements to Avoid Environmental Stress Corrosion Cracking in NACE Middle East Conference held between Sep. 30-Oct. 3, 2018, Conference Paper No. MECCOCT18-12362, Bahrain.
Mohammed Al-Anezi, et al, Prevention of Hydrogen Assisted Damage in Sour Service, Journal of Failure Analysis and Prevention. Dec. 2014, vol. 14, Issue 6, pp. 736-745.

(Continued)

*Primary Examiner* — Jamel E Williams
(74) *Attorney, Agent, or Firm* — Leason Ellis LLP (57) ABSTRACT

A method is provided for determining whether post-weld heat treatments should be required for external attachment welds in applications where stress corrosion cracking is a possibility. According to the method, residual stress values are measured in test samples welded at high input heat levels and test samples welded at low input heat levels for a variety of different wall thickness. A threshold residual stress level is determined according to a method of selecting a common pipe used in industry and measuring the residual stress level in the longitudinal seam of the pipe. The measured residual stress values for the high and low heat input welds are compared against the threshold to determine whether for a particular wall thickness, the high and low input data exceeds the threshold, indicating whether post-weld heat treatments are required.

20 Claims, 8 Drawing Sheets

(56) References Cited

OTHER PUBLICATIONS

International Search Report and Written Opinion in corresponding PCT Application No. PCT/US2022/074243 dated Dec. 5, 2022; 7 pages.
Abson D.J. et al.; A Review of Postweld Heatreatment Code Exemptions; Welding Journal, vol. 85, No. 3, Mar. 1, 2016, pp. 63-69.

* cited by examiner

METHOD TO DETERMINE POST-WELD HEAT TREATMENT REQUIREMENTS FOR EXTERNAL WELDED ATTACHMENT TO AVOID ENVIRONMENTAL STRESS CORROSION CRACKING

FIELD OF THE DISCLOSURE

The present disclosure relates to methods for determining whether post weld heat treatment is required on welded elements. More specifically, the present disclosure introduces methods for determining threshold stress levels and a method for exempting heat treating of a weld without compromising the resistance to stress corrosion cracking by comparing measured stress levels at a weld to the determined threshold stress level.

BACKGROUND OF THE DISCLOSURE

In the past, there has been uncertainty as to whether post weld heat treatments ("PWHT") are required for external attachment welds, such as in petrochemical industry applications, in which stress corrosion cracking ("SCC") is a possible occurrence. SCC can lead to a failure of infrastructure, such as pipeline. External attachment welds, such as those for full encirclement sleeves, reinforcement pads, and other welds, often generate residual stresses though the material, such as the wall of a metal pipe. The amount of residual stress caused by the welds can be measured and, depending of the amount of measured stress, a PWHT process can be applied to reduce the amount of residual stress.

However, it is difficult and impractical to measure residual stresses during piping construction and impractical, if not impossible, to determine whether the measured residual stress is high enough that a PWHT is required. One method, for determining a threshold residual stress upon which PWHT is required it to perform time-to-failure testing. However, such testing methods are relatively difficult and time consuming and further limited by the parameters under which the testing is performed. Accordingly, time-to-failure testing methods are unpractical and not typically adopted in the Oil and Gas industries.

The present disclosure solves these and other problems with a technical solution as disclosed herein.

SUMMARY OF THE DISCLOSURE

According to a broad aspect of the disclosure, a method for determining whether a post weld heat treatment process is required to avoid stress corrosion failure of an external weld joint on a subject pipe having a wall thickness is provided. The method includes the steps of preparing a first group of test samples. Each of the test samples in the first group have a different wall thickness and each of the test samples in the first group are welded at a first welding heat input. A second group test samples, each having a different wall thickness, are prepared and each of the test samples in the second group are welded at a second welding heat input that is lower than the first welding heat input. The residual stress in each of the test samples of different thicknesses in the first and second groups is measured. An upper heat input stress trendline across a plurality of wall thicknesses for the first welding heat input based upon residual stress measured in the first group of test samples versus wall thickness is determined. A lower heat input stress trendline across a plurality of wall thicknesses for the second welding heat input based upon residual stress measured in the second group of test samples versus wall thickness is measured. A residual stress threshold is determined based upon a measured residual stress in a longitudinal seam weld of a selected pipe. An upper intersection point between the upper heat input stress trendline and the residual stress threshold and a lower intersection point between the lower heat input stress trendline and the residual stress threshold are determined. Whether post weld heat treatment is required for the external weld joint is determined based upon the wall thickness of the subject pipe compared to the corresponding wall thickness of the upper intersection point and the lower intersection point such that if the subject pipe wall thickness is less than the corresponding wall thickness of the lower intersection point, then post weld treatment is required, and if the subject pipe wall thickness is greater than the corresponding wall thickness of the upper intersection point, then post weld treatment is not required.

According to a further aspect, the method further includes the step of performing post weld heat treatment based on the determination of whether post weld heat treatment is required.

According to a still further aspect, the first welding heat input approximates an upper welding heat input value that would be expected to occur in actual welding applications.

According to another aspect, the selected pipe is a type of pipe that has typical industry use and wherein the longitudinal seam weld of the selected pipe is known to not typically experience stress corrosion cracking failure.

According to a further aspect, the method further includes the step of providing a tool that provides a visual reference of measured residual stress versus wall thickness that includes the upper heat input stress trendline, the lower heat input stress trendline, a line representing the residual stress threshold, the upper intersection point, and the lower intersection point.

According to a still further aspect, if the subject pipe wall thickness is greater than the corresponding wall thickness of the lower intersection point and is less than the corresponding wall thickness of the upper intersection point, then post weld treatment is required.

According to another aspect, the method further including the step of determining an intermediate heat input stress trendline across a plurality of wall thicknesses for a third welding heat input based upon residual stress measured in a third group of test samples versus wall thickness, wherein the third welding heat input is intermediate the first and second welding heat inputs.

According to a further aspect, the method further includes the step of determining an intermediate intersection point between the intermediate heat input stress trendline and the residual stress threshold, wherein if the external weld joint was applied with a heat input less than the third heat input, then post weld treatment is required if the subject pipe wall thickness is less than the corresponding wall thickness of the intermediate intersection point, and post weld treatment is not required, if the subject pipe wall thickness is greater than the corresponding wall thickness of the intermediate intersection point.

According to a still further aspect, the wall thickness of each of the test samples in the first group correspond to the wall thickness of each of the test samples in the second group.

According to another aspect, the selected pipe is APL 5L Grade X 65 pipe.

According to further aspect, the first welding heat input is 2.0 Kj/mm.

According to still further aspect, the second welding heat input is 0.8 Kj/mm.

According to a broad aspect of the disclosure, a method for developing a tool that can be used to determine whether a post weld heat treatment process is required to avoid stress corrosion failure of an external weld joint on a subject pipe having a wall thickness is provided. The method includes the steps of determining an upper heat input stress trendline across a plurality of wall thicknesses. This includes the steps of preparing a first group of test samples, each having a different wall thickness, and welding each of the test samples in the first group at a first welding heat input. The residual stress in each of the test samples of different thicknesses in the first groups is measured and plotted. The method also includes the steps of determining a lower heat input stress trendline across a plurality of wall thicknesses. This includes the steps of preparing a second group of test samples, each having a different wall thickness, and welding each of the test samples in the second group at a second welding heat input that is less than the first welding heat input. The residual stress in each of the test samples of different thicknesses in the second group is measured and plotted. The method includes determining a residual stress threshold based upon a measured residual stress in a longitudinal seam weld of a selected pipe and plotting the residual stress threshold as a horizontal line across a range of wall thicknesses. An upper intersection point between the upper heat input stress trendline and the residual stress threshold line is determined. A lower intersection point between the lower heat input stress trendline and the residual stress threshold line is determined. The tool of the method can be used to determine whether post weld heat treatment is required for the external weld joint based upon the wall thickness of the subject pipe compared to the corresponding wall thickness of the upper intersection point and the lower intersection point, and if the subject pipe wall thickness is less than the corresponding wall thickness of the lower intersection point, then post weld treatment is required, and if the subject pipe wall thickness is greater than the corresponding wall thickness of the upper intersection point, then post weld treatment is not required.

According to a still further aspect, the first welding heat input approximates an upper welding heat input value that would be expected to occur in actual welding applications.

According to another aspect, the selected pipe is a type of pipe that has typical industry use and wherein the longitudinal seam weld of the selected pipe is known to not typically experience stress corrosion cracking failure.

According to a further aspect, the method includes the steps of plotting upper and lower intersection lines extending vertically and downwardly for the upper and lower intersection points, respectively.

According to another aspect, the selected pipe is APL 5L Grade X 65 pipe.

According to further aspect, the first welding heat input is 2.0 Kj/mm.

According to still further aspect, the second welding heat input is 0.8 Kj/mm.

According to a broad aspect of the disclosure, a method for determining a threshold value for use in determining whether a post weld heat treatment process is required in a particular industry to avoid stress corrosion failure of an external weld joint on a subject pipe having a wall thickness and applying a post weld heat treatment process if the threshold is exceeded is provided. The method includes the step of selecting a representative pipe type that is commonly used in the particular industry, the representative pipe having a longitudinal seam weld, wherein the longitudinal seam weld is not known in the industry to experience stress corrosion cracking failure across a range of industry applications. A residual stress profile of the longitudinal seam weld is measured. A minimum residual stress value of the measured residual stress profile is determined. The threshold value is set to be equal to the determined minimum residual stress value. Post weld heat treatment is applied if the threshold is exceeded.

DETAILED DESCRIPTION OF CERTAIN EMBODIMENTS OF THE DISCLOSURE

Figure 1:
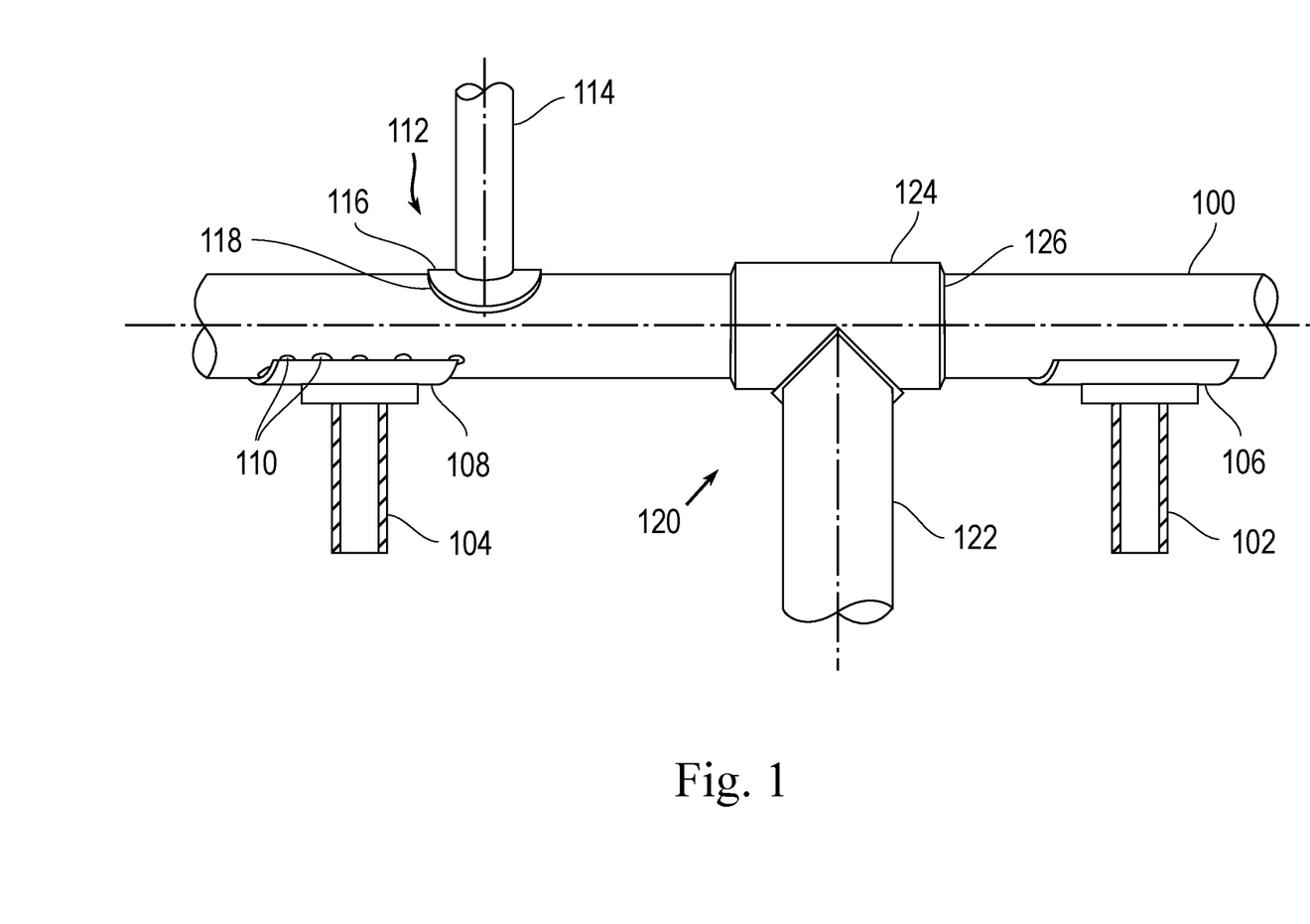
FIG. 1 shows a schematic view of typical weld structural attachments.

The present disclosure introduces technology for addressing problems with determining whether a post weld heat treatment (PWHT) procedure is required after welding applications. Referring to FIG. 1, a schematic illustration of a typical pipe structure with various external attachment weld joints is shown. A pipe 100 is supported by supports 102 and 104 with wear pads 106 and 108 disposed between the supports and the pipe. The wear pads 106, 108 can be connected to the pipe 100 using, for example, fillet welds 110 that are applied at various points along the edge perimeter of the wear pads contacting the pipe. A branch connection 112 is a connection in which a branch pipe 114 is connected to the main pipe 100. A reinforcing pad 116 may be used to reinforce the main pipe 100 around pipe 114 in which a seal weld 118 is applied. At other branch connections, such as branch connection 120, a full encirclement sleeve 124 may be provided to reinforce the main pipe 100 and the branch pipe 122 in which a seam weld 126 is applied, directly deposited on the main pipe 100.

It is to be determined whether PWHT is recommend for external attachment welds that are utilized to attach non-pressure containing components (e.g., reinforcing pad 116, sleeve 124) to pressure containing pipes (e.g., main pipe 100, branch pipes 114, 122) and to seal welds, as shown in FIG. 1, for example. The requirement for PWHT is particularly relevant in petrochemical industry applications where stress corrosion cracking (SCC) is a possibility.

Figure 2:
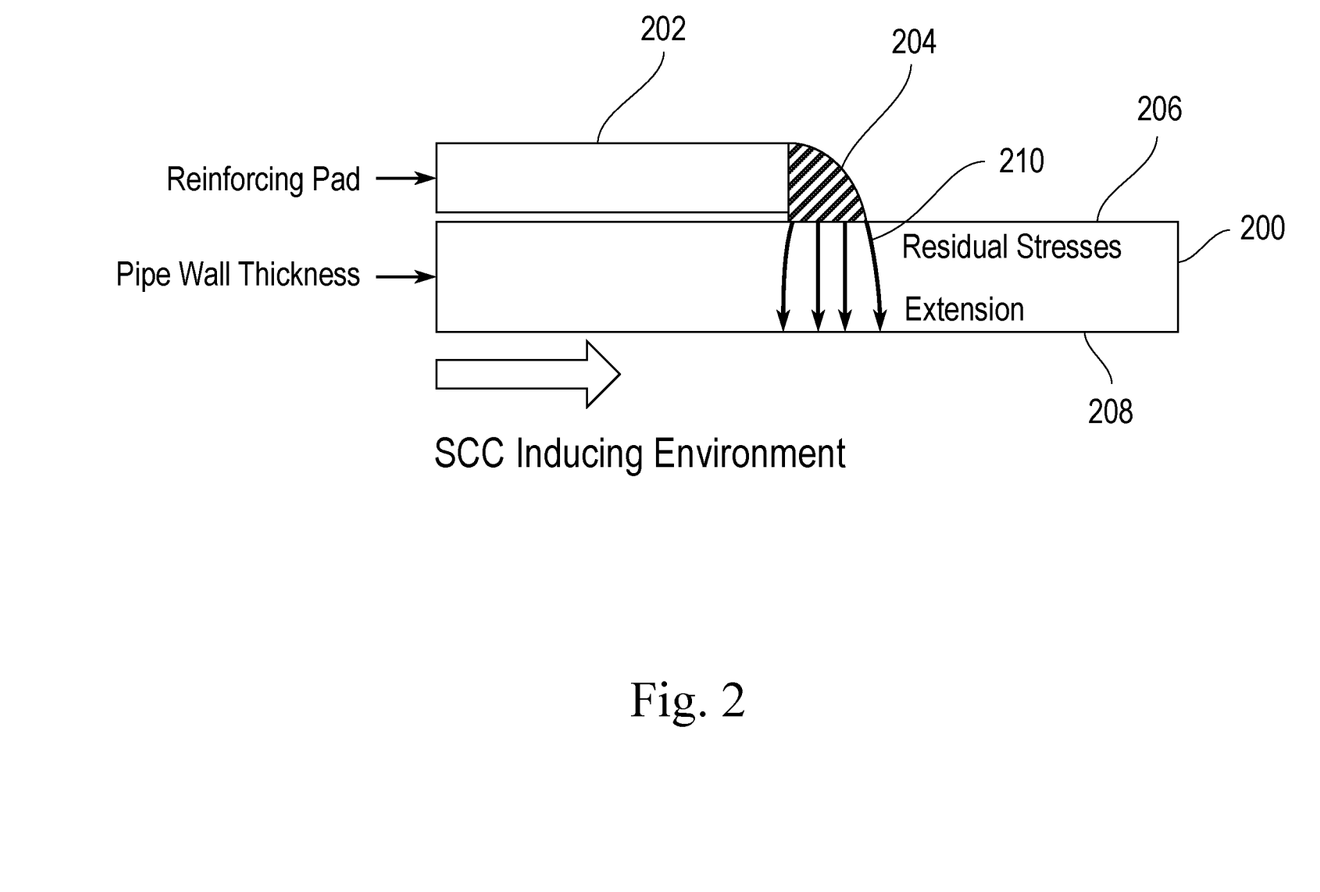
FIG. 2 shows a schematic view illustrating typical stress development conditions toward pipe ID surface that can occur during welding external attachments over a run pipe.

FIG. 2 illustrates an example of the formation of stress that can be generated as the result of external attachment welds. FIG. 2 shows a cross-section of a portion of pipe wall 200 and a portion of an external attachment 202 such as pad, sleeve, saddle (e.g., similar to main pipe 100 and reinforcing pad 116 shown in FIG. 1). A weld deposit 204 extends between an edge of the reinforcing pad 202 and the exterior surface 206 of the pipe wall 200. The interior surface 208 of the pipe wall 200 is exposed to a SCC inducing environment (e.g., the pipe can contain chemicals, such as hydrogen sulfide as one example, or other products that can induce stress corrosion of the pipe material and, hence, can induce SCC). As shown in FIG. 2, under certain conditions the application of the external weld can induce residual stress (illustrated with arrows 210) that extends from the exterior wall 206 to the interior wall 208.

Figure 3:
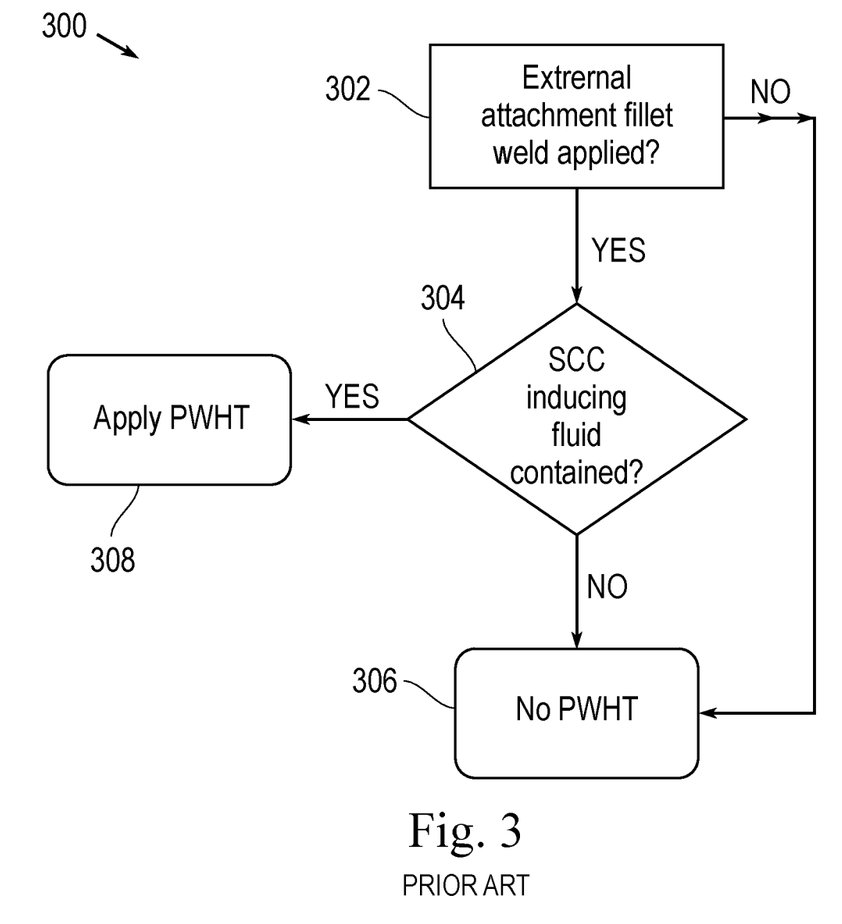
FIG. 3 shows a flow chart illustrating typical PWHT procedure requirements on external attachments.

FIG. 3 illustrates a typical process 300 for determining whether PWHT is required after application of an external weld to the pipe, which is relatively simplistic. At the first step 302, it is determined whether or not an external weld has been applied to the pipe. If no external weld has been applied on external attachment, the process can proceed to step 306 in which no PWHT treatment is applied on attachment. If an external weld has been applied, the process proceeds to step 304 to determine whether the pipe will be exposed to a SCC inducing fluid environment. If no SCC environment is present, the process can proceed to step 306 in which no PWHT process is applied. If a SCC environment is present, the process goes to step 308 and a PWHT application is performed to reduce residual stress caused by the external weld. However, it has been recognized according to the present invention, as discussed in more detail below, that the typical process 300 is inefficient because PWHT is applied in nearly every case, regardless of the actual residual stress condition of the pipe, and that it is possible to provide a workable solution to reduce the application of unnecessary PWHT.

In the typical method 300, PWHT is applied on external piping attachments irrespective to welding conditions and application details if the pipe contains fluid that induces SCC in Oil and Gas industry applications. However, according to an industry standard established by NACE SP0472 (NACE International, NACE SP0472, 15th Edition, Aug. 17, 2020—Methods and Controls to Prevent In-Service Environmental Cracking of Carbon Steel Weldments in Corrosive Petroleum Refining Environments), it is indicated that PWHT is not required for SCC inducing environments if the tensile residual stresses induced by an external welding do not extend through the wall thickness toward the internal surface of the pipe wall. For example, referring to FIG. 2, if the residual stress 210 does not extend to the internal pipe surface 208, PWHT is optional and may not be required. If the developed tensile stresses over the internal surface is detrimental and exceeding a stress threshold that may promote SCC, PWHT would be required. However, there is currently no practical method available to measure the threshold of stresses to avoid SCC in the oil and gas industry. Accordingly, the present invention takes advantage of the fact that PWHT is not necessarily required for all welds by providing an improved, practical method for determining a residual stress threshold and for determining whether PWHT is required in view of the residual stress threshold, as discussed in more detail herein.

Figure 4:
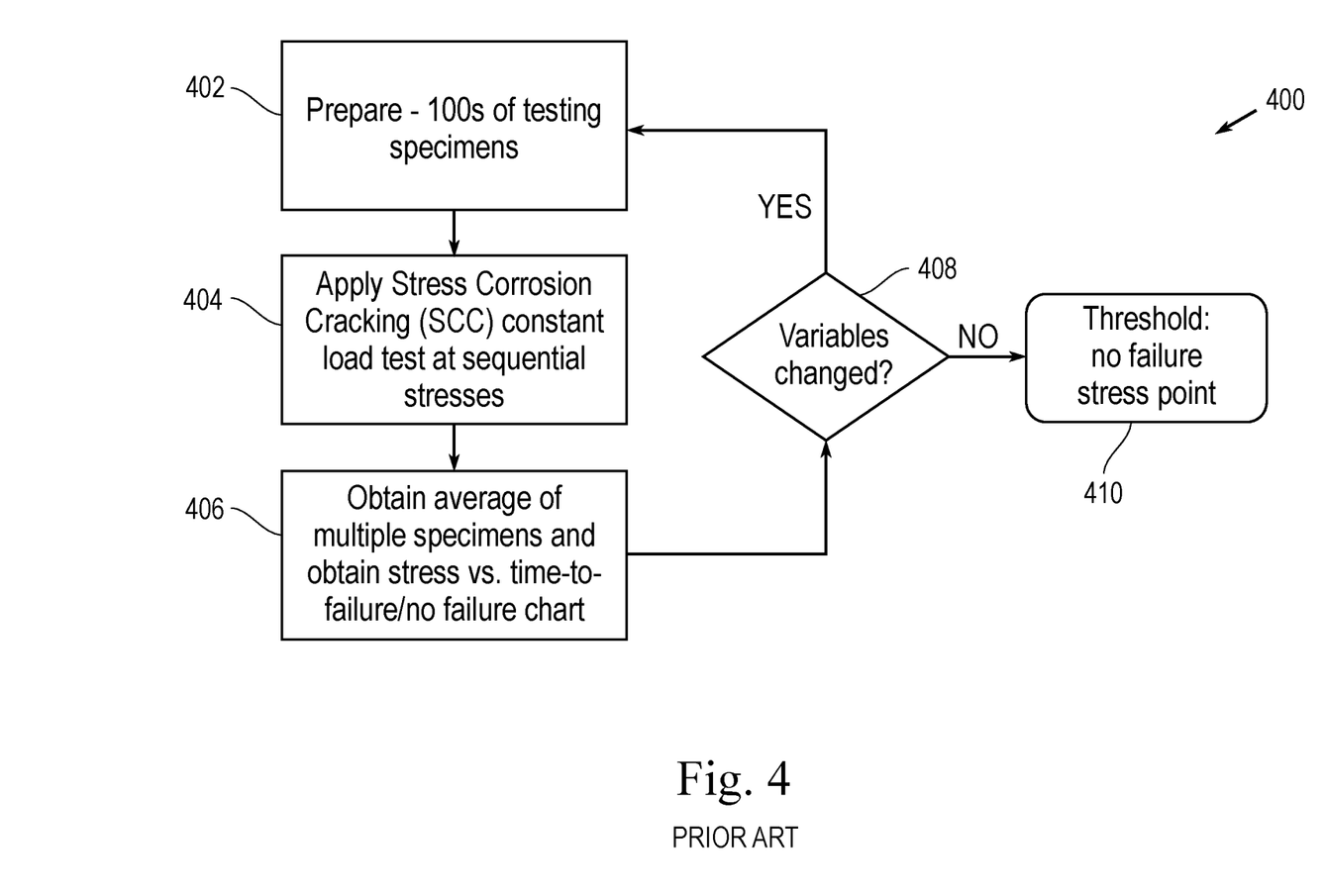
FIG. 4 shows a flow chart illustrating typical empirical procedures for determining stress thresholds for PWHT, which does not result in SCC failure.

In order to determine the threshold of stress to avoid SCC, it is typically required to empirically generate data by using hundreds of test specimens and subjecting them to laboratory testing for each specific material and specific fluid condition (e.g., fluid composition, temperature, pressure, material grade, metallurgical structure, etc.). FIG. 4 illustrates the steps of this typical empirical method 400. The first step 402 involves preparing hundreds of tensile test specimens. A stress testing step 404 is applied to each test specimen set, i.e., composed of three specimens, in which each test specimen set is subjected to a constant stress level and exposed to the SCC inducing fluid to obtain the SCC time-to-failure value corresponding to the applied stress level. At step 404, multiple stress tests are performed on sequential test specimen sets at different stress levels. Typically, this test is performed initially at a high tensile stress level and continues on subsequent test sets at lower stress level points until a stress level is reached where the time-to-failure is almost infinite. The stress point with almost infinite time-to-failure represents the empirical threshold stress below which no SCC will occur.

Figure 5:
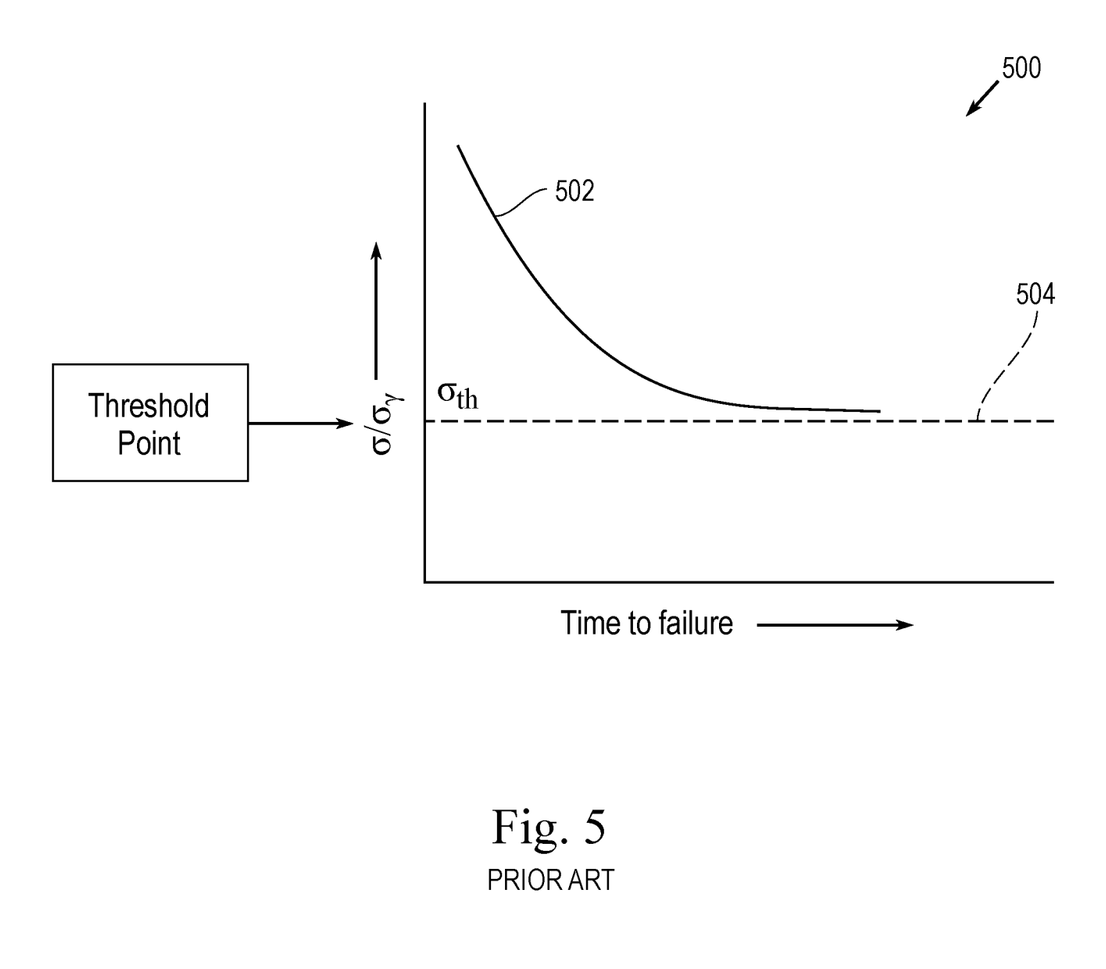
FIG. 5 shows a typical stress to time to failure schematic curve.

Accordingly, multiple data points relating to the stress levels and the time-to-failure are generated through the testing. Moreover, at each testing point, three specimens are tested to obtain an average value for the time-to-failure at that specific testing condition at step 406. The data gathered by the testing can be graphed 500 and results in an exponential curve 502 of stress level as a function of time-to-failure. FIG. 5 is an example of the curve 502 generated by such test data. Below a certain stress level, effectively no SCC failure will occur even after near infinite time. This no-failure stress level represents a threshold indicated by line 504.

Figure 6:
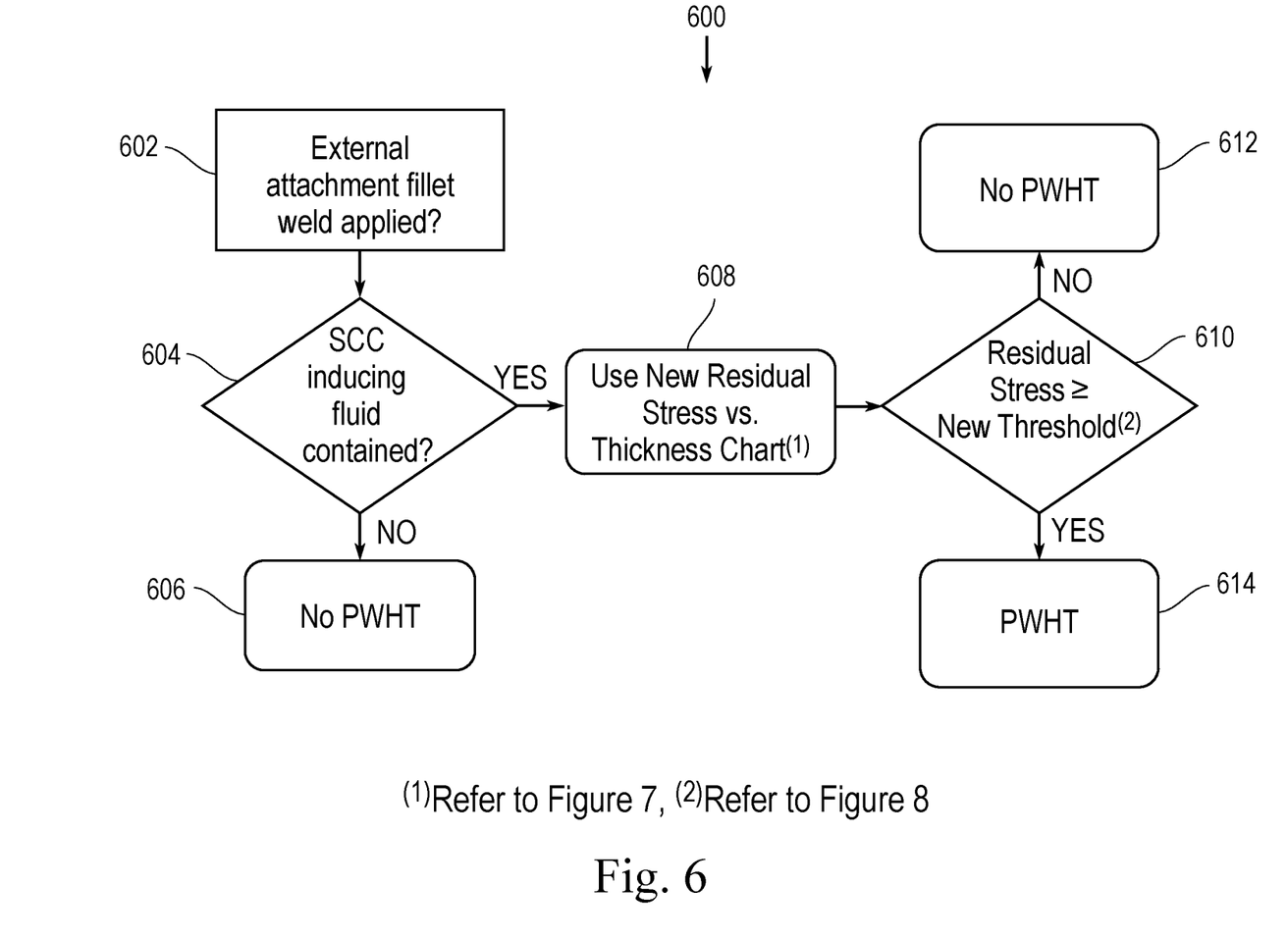
FIG. 6 shows a flow chart illustrating procedures for determining the application and requirements of PWHT according to an embodiment of the present invention.
Figure 7:
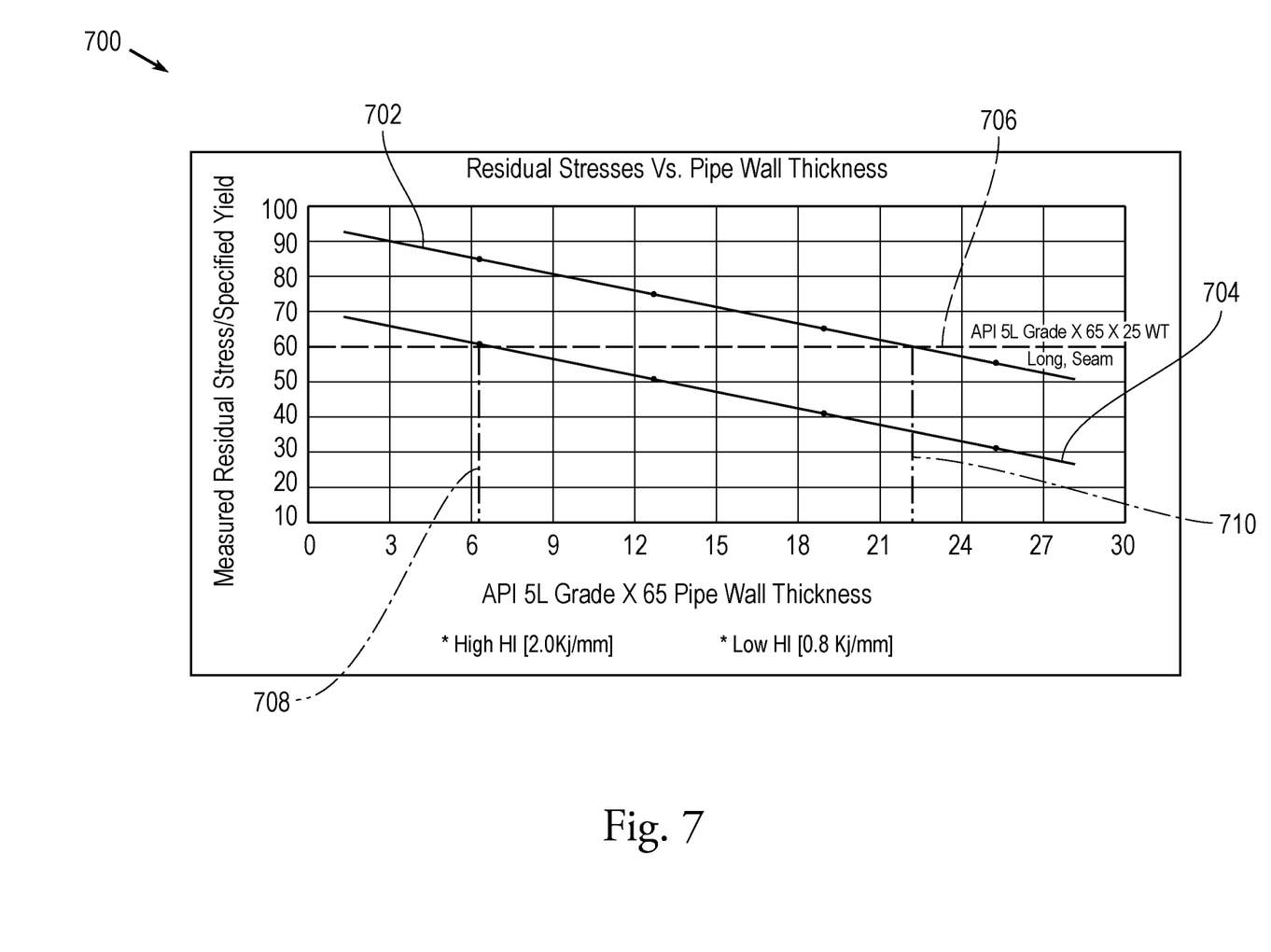
FIG. 7 shows a chart illustrating an example of a correlation chart between measured stress at low and high heat conditions for a range of wall thicknesses versus threshold residual stress according to an embodiment of the present invention.
Figure 8:
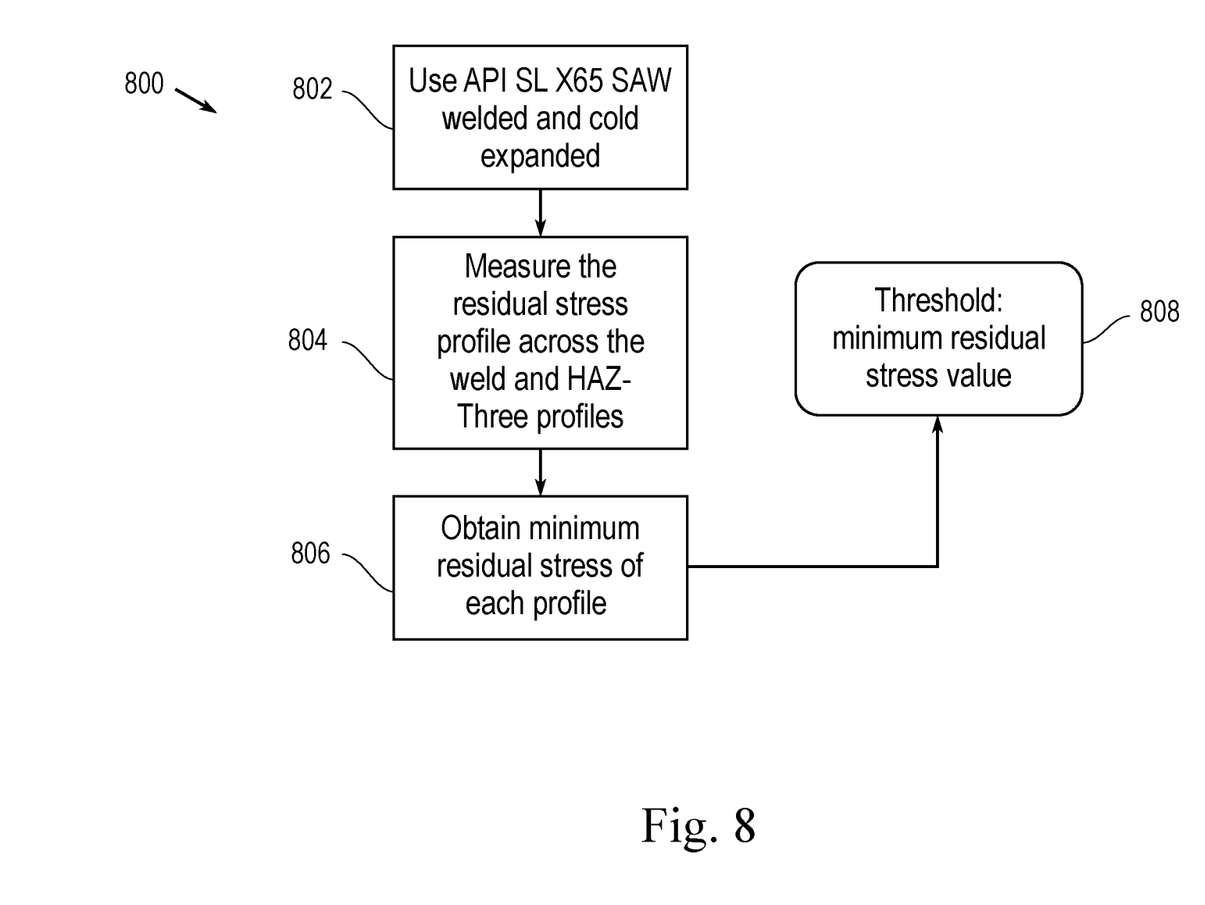
FIG. 8 shows a flow chart illustrating procedures for determining threshold stress values to an embodiment of the present invention, using the most typical high strength pipes for wet sour environment.

The testing procedure represented in FIG. 4 and the resulting graph can produce a threshold value, this threshold value is limited to a very specific set of variables that were present in the testing procedure. If there is no change in the variables that were tested, at step 410 the threshold value can be useful for that specific condition. However, if any of the variables that were present in the testing procedure, such as fluid conditions, temperature, or pipe material conditions, etc., are changed, then at step 408 it is required to repeat steps 402-406 using the new variables. Accordingly, this procedure requires a very long lead time to obtain the curve for each single condition (e.g., since hundreds of samples have to be tested in sets at difference stress levels and the data has to be collected and processed) and this long lead time is further exacerbated because if there are any changes to the variables the process has to be repeated again for these new variables. In practical applications in which pipes are being welded (e.g., oil transport, storage, refining applications, etc.) many different variables will be encountered and will need to be accounted for by performing this test procedure to obtain an individualized threshold value for each specific combination of parameters. Performing such exhaustive testing for a large number of variable conditions is prohibitive. Therefore, this time-to-failure testing to obtain thresholds is not practical and is not typically implemented in the oil and gas industries. Essentially, the benefit that could be obtained by avoiding PWHT in the certain instance where it is not necessary, is negated because the testing to obtain the threshold data according to the method illustrated in the flow chart of FIG. 4 is too costly and time consuming to provide practical benefit and is not typically implemented in the Oil and Gas industry. Accordingly, a new decision methodology is provided to determine whether PWHT is required or can be waived, as illustrated in FIG. 6, including a new method for determining threshold stress levels, as illustrated in FIGS. 7 and 8, where are discussed below.

Part of the new method involves obtaining data on stress levels that occur across a range of material wall thicknesses and weld heat inputs. A number of typical pipe wall thickness values can be selected. As non-limiting example, carbon steel API 5L grade X65 pipe of 6 mm (¼ in.), 12 mm (½ in.), 19 mm (¾ in.), and 25 mm (1.0 in.) can be used, as illustrated by the data points in FIG. 7.

The sample pieces of the various wall thickness are welded using three bead-on-plate passes, which is the adequate number of run pipe buttering deposits, applied for attaching an external reinforcement pad to an external pipe body. In other arrangements, it may be possible to use a different number and/or type of weld deposits depending on the type of materials, connection types, and/or application requirements. In the example shown in FIG. 7, the welding passes are deposited adjacent to each other with no gap or overlap, while maintaining the maximum allowable interpass temperature for each pass, that is, approximately 315° C. and 100° C. preheating, which represents a high heat input condition. The welding is carried out using a Shield Metal Arc Welding (SMAW) process, which is a versatile field welding process utilized for external attachment to pipe walls. This combination of welding technique and temperatures represents a maximum temperature, worst-case welding scenario that would be expected to occur in real-world welding applications that may develop the maximum residual stresses around the weld at ID surface. However, depending on various factors, such as field of use, materials, connection types, application requirements, etc., different "worst case" welding procedures and temperatures can be established to represent conditions that would be expected to occur in real-world welding applications. It should be further understood that some variance from the maximum temperature values can be acceptable, including a variance of several degrees, such as 5° C., 10° C., 20° C., 30° C., or other variance amounts that would still represent a maximum or upper temperature value, for example.

This process is repeated under a low heat conditions. Accordingly, sample pieces of the various wall thickness are welded using three bead-on-plate passes. In the example shown in FIG. 7, the welding passes are deposited adjacent to each other with no gap or overlap, while maintaining the minimum allowable low preheat and interpass temperature, that is, approximately 50° C., which represents a low heat input condition. This welding procedure is performed to simulate actual attachment seal welds that are typical in real-world welding applications, and approximates a minimum temperature value that would be expected to occur in real-world applications. It should be further understood that some variance from the minimum temperature values can be acceptable, including a variance of several degrees, or other variance amounts that would still represent a minimum or lower temperature value, for example.

The high heat welding procedure is performed using a high heat input of 2.0 Kj/mm and the low heat welding procedure is performed using a low heat input of 0.8 Kj/mm, which are selected to reflect the commonly applied heat input range for SMAW in the Oil and Gas industry. It should be further understood that some variance from the high and low heat input values can be acceptable, including a variance of several tenths of a Kj/mm, or other variance amounts that would still represent an upper or lower heat input value that would approximate industry expected maximums and minimums, for example. The maximum heat input can be achieved using large size (e.g., 4.0 mm or 4.7 mm) of low hydrogen electrode (e.g., an E7018 electrode, which is a typical low hydrogen electrode type). Similarly, the minimum input can be achieved using smaller size (e.g., 1.6 mm or 2.4 mm) of low hydrogen electrode (e.g., an E7018 electrode). These welding parameters are typical of real-world welding procedures in the Oil and Gas industry, for example, and are used to generate the high heat residual stress curve line 702 and the low heat residual stress curve line 704 of FIG. 7, as discussed in more detail below. In other arrangements, it may be possible to use different maximum and minimum temperature ranges, heat input ranges, electrode sizes, electrode types, etc., depending on the type of materials, connect types, and/or application requirements.

After the test samples of the various wall thicknesses are welded using the maximum and minimum (high and low) heat inputs, the samples are measured for residual stress. The residual stress is measured on the opposite side of the weld, which represents in inner wall of the pipe (see, for example, inner surface 208 of FIG. 2 as a similar illustration). The residual stress can be measured using industry acceptable measuring techniques, such as hole drilling techniques, stress measuring standard ASTM E837, X-ray diffraction techniques, or any other acceptable alternatives. Referring to FIG. 7, a tool 700 is provided to graph the measured residual stress values for the maximum and minimum heat input welding conditions across the different wall thicknesses. As discussed above, two isothermal heat input lines are plotted that represent the residual stress variation with respect to wall thickness. Graph trendline 702 represents the residual stress resulting from the high heat input applied over a range of different wall thicknesses, including the four different plate thicknesses of the test samples. Graph trendline 704 represents the residual stress profile developed by the low heat input over a range of different wall thicknesses, including the four different plate thickness of the test samples.

The new method for determining whether PWHT is required is illustrated in FIG. 6 in flow chart 600, which is described in more detail below, and involves the use of the graph lines in FIG. 7. As can be seen in the graph of FIG. 7, the higher heat input applied to a given plate thickness develops a higher tensile residual stress in the opposite side of the plate, compared to the residual stress resulting from the lower heat input, that is, for a given plate thickness, graph line 702 is above graph line 704. Also, as can be seen in the graph, the same heat input will develop a lower tensile residual stress on the other side of the plate as the plate thickness increases, that is, both graph lines 702 and 704 slope downwards as plate thickness increases.

Dashed line 706 represents the threshold stress below which PWHT can be waived (or is optional) and above which PWHT is required. The determination of the threshold stress represented by line 706 is discussed in more detail in connection with the method illustrated in FIG. 8, as discussed in more detail below, as related to a particular pipe type (for example, a typical pipe used in the Oil and Gas industry, namely, APL 5L Grade X 65 pipe is illustrated in FIG. 7). The pipe grade and proposed wall thickness (1-inch) are the most typical pipe specification for on-plot pipe used in wet sour environment (however, it is possible, depending on application requirements, to use other pipe types/specifications without departing from the scope of the invention). Intersection lines 708 and 710 illustrate the points at which threshold line 706 intersects with the low heat input line 704 and high heat input line 702, respectively, and represent the minimum acceptable wall thickness of which PWHT application can be waived (or is optional) for external attachment welds, with respect to the corresponding heat inputs. For example, intersection line 708 indicates that for wall thickness less than about 6 mm, PWHT is required even under the low heat input welding conditions. Since the low heat input welding condition was developed to simulate the lowest heat input values that would be encountered in real-world welding, intersection line 708 indicates that for all welds on wall thicknesses that are less than about 6 mm, PWHT is required. On the other end of the graph, intersection line 710 indicates that for wall thicknesses greater than about 22 mm, PWHT is not required even under the high heat input welding conditions. Since the high heat input welding condition was developed to simulate the highest heat input values that would be encountered in real-world welding (a "worst-case scenario), intersection line 710 indicates that for all welds on wall thickness that are greater than about 22 mm, PWHT is not required.

Accordingly, the graph of FIG. 7 provides a significant advantage by providing an improved method for determining whether PWHT is required based upon the wall thickness of the material welded for a significant range of wall thicknesses. If the wall thickness is less than about 6 mm, then PWHT is generally always required, and if the wall thickness is greater than about 22 mm, then PWHT is generally not required. The area of the graphs between the intersection lines 708 and 710 indicates that whether or not PWHT is both dependent on the wall thickness and the heat input level. If the wall thickness is between approximately 6 mm and about 22 mm, then PWHT is not required if the heat input is low, but PWHT is required if the heat input is high since it can be seen that within this wall thickness range all high heat residual stress values (line 702) are above the threshold line 706. However, maximum allowable heat input (between the maximum and minimum heat inputs) can be predicted and interpolated for a wall thickness falling in between 6 mm and 22 mm, at below PWHT can be exempted.

The method for determining the threshold residual stress line 706 value is illustrated in the flow chart 800 of FIG. 8. Pipe that is typically used in the Oil and Gas industry is fabricated by the manufacturer with a seam weld that runs along the longitudinal axis of the pipe. For example, a conventional pipe used in the Oil and Gas industry, namely, API-5L grade X65 X, is a carbon steel pipe that is cold expanded and includes a longitudinal seam. The longitudinal seam is typically made by a Submerged Arc Weld (SAW) process, which involves applying very high heat and this welded seam is typically not stress relieved. Despite this longitudinal seam not being stress relieved, the literature and industry has not reported SCC in oil and gas sour services along the pipe straight seam in typical industry applications. According to the new method disclosed herein, it is recognized that the residual stress levels caused by the welding of the longitudinal seam can be used as a threshold residual stress level to determine whether PWHT is required in other external welds since the residual stress levels that are present in the longitudinal seam do not typically lead to a SCC failure. The measured tensile residual stress across the weld root side of large thickness-high strength pipe grade, API 5L grade X65, presents an acceptable and safe level of residual stress for operation and can therefore denotes a threshold limit in oil and gas industry in SCC inducing environments.

Referring to FIG. 8, according to the method to obtain the threshold stress level using the longitudinal seam illustrated in flow chart 800, at step 802 a pipe (or sample thereof) of the type API 5L X65 that has been SAW welded and cold expanded of 1-inch wall thickness (a type of pipe typical of the oil and gas industry) is provided. The proposed pipe material grade (i.e. which is the maximum piping materials typically permitted in sour applications) and wall thickness is determined because it demonstrates the maximum acceptable and practical tensile residual stresses limit. At step 804, residual stress measurements are performed along the longitudinal seam welds across the welds and Heat Affected Zone (HAZ) at ID surface to obtain the residual stress profile. The residual stress can be can be measured using industry acceptable measuring techniques, such as hole drilling techniques, stress measuring standard ASTM E837, X-ray diffraction techniques, or any other acceptable alternatives. This process is performed three times to obtain three profiles. At step 806, the minimum residual stress that was measured in the three profiles is obtained from the measurement data. At step 808, the threshold value is set to be the minimum measured residual stress value. The minimum residual stress value is selected since it is the lowest value that does not lead to SCC failure and, therefore, represents a conservative value that can be safely used as a threshold. The threshold value obtained at step 808 as part of this method is represented as threshold line 706 in FIG. 7.

Referring back to FIG. 6, the new method for determining whether PWHT is required is illustrated in flow chart 600. At step 602, it is determined whether an external attachment weld has been applied. If an external attachment weld has been applied, at step 604 it is determined if SCC inducing fluid will be contained within the pipe to which the external attachment weld has been applied. If no SCC inducing fluid will be present, then at step 606 it is determined that no PWHT is required. If SCC inducing fluid will be present, then at step 608 the new tool shown in FIG. 7 is referenced, as it illustrates residual stress versus thickness that has been generated according to the present method. At step 610, it is determined whether residual stress values based on heat input and wall thickness represented by lines 702 and 704, are below the threshold value (line 706) based upon the longitudinal seam reference obtained according to the method illustrated in FIG. 8. If the tool of FIG. 7 indicates that for the present wall thickness and heat input level for the weld is below threshold line 706, then at step 612 it is determined that no PWHT is required. If the tool of FIG. 7 indicates that for the present wall thickness and heat input level for the weld is above threshold line 706, then at step 614 it is determined that PWHT is required and PWHT should be performed.

The methods of the present invention provide significant advantages over prior methods that rely upon performing time-to-failure testing. As discussed in connection with FIGS. 4 and 5, time-to-failure testing is inherently costly and time consuming given the number of samples required and the time required to perform each test until failure occurs. Moreover, time-to-failure testing threshold data is specific to the parameters (e.g., temperature, SCC fluid type, etc.) that are present in the testing methods that were used to obtain that threshold value. As such, if any of the parameters change, the entire time-to-failure testing protocol must be repeated to obtain a new threshold value.

In contrast, in the present method, the residual stress threshold value is determined by measuring the residual stress level present in the longitudinal seam weld of a pipe that is widely used in industry and is exposed to a wide variety of real-world operating parameters, including a wide variety of temperature ranges, SCC fluid types, etc., without developing SCC failure. Since pipe longitudinal seam welds do not fail, even across a wide variety of real-world parameters, it is recognized according to the present method that the measured residual stress value of the longitudinal seam weld can be used to determine a generally "universal" stress threshold level below which SCC will not occur. The present method recognizes that since real-world exposure conditions do not result in SCC failure of the longitudinal seam weld, that can be leveraged so that the real-world use of these pipe can substitute for performing laboratory-based, time-to-failure experiments that are parameter specific. Accordingly, since the present method determines a threshold based upon the residual stress in the longitudinal seam weld, performing time-to-failure testing to determine a threshold is avoided. Moreover, the threshold of the present method is generally "universal" since the real-world exposures represents wide parameter exposure.

Further, in the present method, residual stress levels are measured according to weld heat inputs versus wall thickness. The data of the present method is obtained by measuring residual stress values, and this avoids the drawbacks of time-to-failure testing that requires actually exposing the welded test samples to the SCC inducing environment and performing the test until failure occurs, which, under certain conditions, failure may not occur for a relatively long time, thereby increasing the time, expense, and difficulty associated with time-to-failure testing. Rather, in the present method, samples of different wall thickness are welded at a maximum, high heat input and a minimum, low heat input and the residual stress levels at the particular wall thickness and heat input level is measured, which is a more efficient process. This thickness versus residual stress level data can be graphed for the maximum, high heat condition and the minimum, low heat condition, along with the new, longitudinal seam-based threshold value. As such, a tool (such as a visual reference chart as shown FIG. 7, for example) can be provided that streamlines and improves the determination method as to whether PWHT is required. Such a tool can be used to determine whether PWHT is required with only knowing the weld heat input value and the wall thickness to determine whether such a combination exceeds the threshold. Since the minimum, low heat graph line is developed to approximate the minimum heat input values that would be expected in real-world conditions, the intersection point between the minimum, low heat line with the threshold line can be used to generalize that below a certain wall thickness, PWHT is required for essentially all welds. In addition, since the maximum, high heat graph line is developed to approximate the maximum heat input values that would be expected in real-world conditions, the intersection point between the maximum, high heat line with the threshold line can be used to generalize that above a certain wall thickness, PWHT is not required for essentially all welds. For at least these conditions, the present determination method provides a significant improvement over time-to-failure based methods.

For wall thickness that fall between the minimum and maximum intersections points, whether PWHT is required is dependent on whether the residual stress for the combination for the wall thickness and weld heat input is above or below the threshold. However, the determination method can be further simplified since the minimum, low heat weld data represents the lowest residual stress that would be expected to be generated in real-world welding applications, the minimum, low heat weld data approximates a "best-case" scenario. As such, by determining that PWHT is required for all wall thicknesses between the minimum and maximum intersection points, SCC failure can be avoided without having to reliably know the actual heat input level for the applied weld. This present method provides a straight forward and reliable means of determining whether PWHT is required without having to perform potentially unreliable weld heat input measurements.

Additionally, further residual stress versus thickness data can be incorporated into the tool for intermediate heat input values between the maximum and minimum values. As such, intermediate threshold intersection points can be provided on the graph that be used to determine whether PWHT is required if the weld input heat can be measured. If the weld is known to have been performed below an intermediate heat input level, then for all wall thicknesses below the intermediate intersection point PWHT is required. While using intermediate heat input data requires the additional steps of generating the intermediate heat input graph lines and further requires knowing the heat input value of the actual weld, such a method is still advantageous since it still avoids the need for performing time-to-failure testing. Moreover, if it is known that the external weld joint was actually applied at the lower heat input level, then for any wall thicknesses greater than the lower intersection point, PWHT is not required since the lower heat input level trendline falls below the threshold for all wall thickness values above the lower intersection point. Similarly, if it is known that the external weld joint was actually applied at the upper heat input level, then for any wall thicknesses less than the upper intersection point, PWHT is required since the upper heat input level trendline falls above the threshold for all wall thickness values below the upper intersection point.

Accordingly, the present methods described herein provide significant advantages over prior methods for at least the reasons described herein, including, but not limited to, avoiding unpractical, parameter specific time-to-failure testing and allowing for determinations of whether PWHT is required as a function of minimum and maximum intersection points that represent "best case" and "worst case" scenarios, respectively.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

Notably, the figures and examples above are not meant to limit the scope of the present application to a single implementation, as other implementations are possible by way of interchange of some or all of the described or illustrated elements. Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

While various implementations of the present application have been described above, it should be understood that they have been presented by way of example, and not limitation. It would be apparent to one skilled in the relevant art(s) that various changes in form and detail could be made therein without departing from the scope of the application. Thus, the present application should not be limited by any of the above-described example implementations.

What is claimed is:

1. A method for determining whether a post weld heat treatment process is required to avoid stress corrosion failure of an external weld joint on a subject pipe having a wall thickness, comprising the steps of:
   preparing a first group of test samples, each of the test samples in the first group having a different wall thickness;
   welding each of the test samples in the first group at a first welding heat input;
   preparing a second group test samples, each of the test samples in the second group having a different wall thickness;
   welding each of the test samples in the second group at a second welding heat input, the second welding heat input being lower than the first welding heat input;
   measuring the residual stress in each of the test samples of different thicknesses in the first and second groups;
   determining an upper heat input stress trendline across a plurality of wall thicknesses for the first welding heat input based upon residual stress measured in the first group of test samples versus wall thickness;
   determining a lower heat input stress trendline across a plurality of wall thicknesses for the second welding heat input based upon residual stress measured in the second group of test samples versus wall thickness;
   determining a residual stress threshold based upon a measured residual stress in a longitudinal seam weld of a selected pipe;
   determining an upper intersection point between the upper heat input stress trendline and the residual stress threshold;
   determining a lower intersection point between the lower heat input stress trendline and the residual stress threshold; and
   determining whether post weld heat treatment is required for the external weld joint based upon the wall thickness of the subject pipe compared to the corresponding wall thickness of the upper intersection point and the lower intersection point,
   wherein if the subject pipe wall thickness is less than the corresponding wall thickness of the lower intersection point, then post weld treatment is required, and if the subject pipe wall thickness is greater than the corresponding wall thickness of the upper intersection point, then post weld treatment is not required.

2. The method of claim 1, further including the step of performing post weld heat treatment based on the determination of whether post weld heat treatment is required.

3. The method of claim 1, wherein the first welding heat input approximates an upper welding heat input value that would be expected to occur in actual welding applications.

4. The method of claim 1, wherein selected pipe is a type of pipe that has typical industry use and wherein the longitudinal seam weld of the selected pipe is known to not typically experience stress corrosion cracking failure.

5. The method of claim 1, further including the step of providing a tool that provides a visual reference of measured residual stress versus wall thickness that includes the upper heat input stress trendline, the lower heat input stress trendline, a line representing the residual stress threshold, the upper intersection point, and the lower intersection point.

6. The method of claim 1, wherein if the subject pipe wall thickness is greater than the corresponding wall thickness of the lower intersection point and is less than the corresponding wall thickness of the upper intersection point, then post weld treatment is required.

7. The method of claim 1, further including the step of determining an intermediate heat input stress trendline across a plurality of wall thicknesses for a third welding heat input based upon residual stress measured in a third group of test samples versus wall thickness, wherein the third welding heat input is intermediate the first and second welding heat inputs.

8. The method of claim 7, further including the step of determining an intermediate intersection point between the intermediate heat input stress trendline and the residual stress threshold, wherein if the external weld joint was applied with a heat input less than the third heat input, then post weld treatment is required if the subject pipe wall thickness is less than the corresponding wall thickness of the intermediate intersection point, and post weld treatment is not required, if the subject pipe wall thickness is greater than the corresponding wall thickness of the intermediate intersection point.

9. The method of claim 1, wherein the wall thickness of each of the test samples in the first group correspond to the wall thickness of each of the test samples in the second group.

10. The method of claim 1, wherein the selected pipe is APL 5L Grade X 65 pipe.

11. The method of claim 1, wherein the first welding heat input is 2.0 Kj/mm.

12. The method of claim 1, wherein the second welding heat input is 0.8 Kj/mm.

13. A method for developing a tool that can be used to determine whether a post weld heat treatment process is required to avoid stress corrosion failure of an external weld joint on a subject pipe having a wall thickness, comprising the steps of:
   determining an upper heat input stress trendline across a plurality of wall thicknesses, including the steps of:

preparing a first group of test samples, each of the test samples in the first group having a different wall thickness;

welding each of the test samples in the first group at a first welding heat input;

measuring the residual stress in each of the test samples of different thicknesses in the first groups plotting the measured residual stress and corresponding wall thickness for each of the first group of test samples;

determining a lower heat input stress trendline across a plurality of wall thicknesses, including the steps of:

preparing a second group of test samples, each of the test samples in the second group having a different wall thickness;

welding each of the test samples in the second group at a second welding heat input, the second welding heat input being less than the first welding heat input;

measuring the residual stress in each of the test samples of different thicknesses in the second group;

plotting the measured residual stress and corresponding wall thickness for each of the second group of test samples;

determining a residual stress threshold based upon a measured residual stress in a longitudinal seam weld of a selected pipe;

plotting the residual stress threshold as a horizontal line across a range of wall thicknesses;

determining an upper intersection point between the upper heat input stress trendline and the residual stress threshold line; and determining a lower intersection point between the lower heat input stress trendline and the residual stress threshold line; and wherein the tool can be used to determine whether post weld heat treatment is required for the external weld joint based upon the wall thickness of the subject pipe compared to the corresponding wall thickness of the upper intersection point and the lower intersection point, wherein if the subject pipe wall thickness is less than the corresponding wall thickness of the lower intersection point, then post weld treatment is required, and if the subject pipe wall thickness is greater than the corresponding wall thickness of the upper intersection point, then post weld treatment is not required.

14. The method of claim 13, wherein the first welding heat input approximates an upper welding heat input value that would be expected to occur in actual welding applications.

15. The method of claim 13, wherein selected pipe is a type of pipe that has typical industry use and wherein the longitudinal seam weld of the selected pipe is known to not typically experience stress corrosion cracking failure.

16. The method of claim 13, further including the steps of plotting upper and lower intersection lines extending vertically and downwardly for the upper and lower intersection points, respectively.

17. The method of claim 13, wherein the selected pipe is APL 5L Grade X 65 pipe.

18. The method of claim 13, wherein the first welding heat input is 2.0 Kj/mm.

19. The method of claim 13, wherein the second welding heat input is 0.8 Kj/mm.

20. A method for determining a threshold value for use in determining whether a post weld heat treatment process is required in a particular industry to avoid stress corrosion failure of an external weld joint on a subject pipe having a wall thickness and applying a post weld heat treatment process if the threshold is exceeded, comprising the steps of:

selecting a representative pipe type that is commonly used in the particular industry, the representative pipe having a longitudinal seam weld, wherein the longitudinal seam weld is not known in the industry to experience stress corrosion cracking failure across a range of industry applications;

measuring a residual stress profile of the longitudinal seam weld;

determining a minimum residual stress value of the measured residual stress profile;

setting the threshold value equal to the determined minimum residual stress value; and applying a post weld heat treatment process if the threshold is exceeded.

* * * * *

UNITED STATES PATENT AND TRADEMARK OFFICE
CERTIFICATE OF CORRECTION

| | |
|---|---|
| PATENT NO. | : 11,965,819 B2 |
| APPLICATION NO. | : 17/444308 |
| DATED | : April 23, 2024 |
| INVENTOR(S) | : Tariq A. Alghamdi and Rashid D. Al-Hajri |

It is certified that error appears in the above-identified patent and that said Letters Patent is hereby corrected as shown below:

On the Title Page (73) the name of the assignee:
"SAUDI ARABIAM OIL COMPANY"
Should read:
-- SAUDI ARABIAN OIL COMPANY --.

Signed and Sealed this
Fourth Day of June, 2024

Katherine Kelly Vidal
*Director of the United States Patent and Trademark Office*